United States Patent
Suzuki et al.

(10) Patent No.: US 10,166,918 B2
(45) Date of Patent: Jan. 1, 2019

(54) DRIVE ASSISTING APPARATUS

(71) Applicant: YAZAKI CORPORATION, Tokyo (JP)

(72) Inventors: Yukio Suzuki, Shizuoka (JP); Kenichi Nagahashi, Shizuoka (JP); Takashi Shiota, Shizuoka (JP); Hiroki Kojima, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 15/662,053

(22) Filed: Jul. 27, 2017

(65) Prior Publication Data

US 2018/0111551 A1 Apr. 26, 2018

(30) Foreign Application Priority Data

Oct. 20, 2016 (JP) ................................ 2016-206252

(51) Int. Cl.
*B60Q 9/00* (2006.01)
*G06K 9/00* (2006.01)

(52) U.S. Cl.
CPC ........... *B60Q 9/00* (2013.01); *G06K 9/00791* (2013.01); *G06K 9/00798* (2013.01); *B60Y 2302/03* (2013.01)

(58) Field of Classification Search
CPC ... B60Q 9/00; G06K 9/00791; B60Y 2302/03
See application file for complete search history.

(56) References Cited

U.S. PATENT DOCUMENTS

| | | | | |
|---|---|---|---|---|
| 2009/0312888 A1* | 12/2009 | Sickert | ................. | G08G 1/0962 701/1 |
| 2013/0083197 A1* | 4/2013 | Yamakage | ........... | G07C 5/0891 348/148 |
| 2016/0350606 A1* | 12/2016 | Yoshitomi | .......... | G06K 9/00818 |

FOREIGN PATENT DOCUMENTS

| | | |
|---|---|---|
| JP | 2012-22504 A | 2/2012 |
| JP | 2016-57839 A | 4/2016 |

* cited by examiner

*Primary Examiner* — Sisay Yacob
(74) *Attorney, Agent, or Firm* — Kenealy Vaidya LLP

(57) ABSTRACT

A drive assisting apparatus includes a running state detection unit which detects a running state of a vehicle, a manipulation detection unit which detects a drive manipulation of a driver on the vehicle, a line-of-sight direction detection unit which detects a line-of-sight direction of the driver, a pattern storage unit which is stored in advance with data indicating combinations of a vehicle running state and a driver drive manipulation and a driver line-of-sight direction pattern, and a warning signal output unit. The warning signal output unit outputs a warning signal if a combination of the running direction detected by the running state detection unit, the drive manipulation detected by the manipulation detection unit, and the line-of-sight direction detected by the line-of-sight direction detection unit is different from any of the combinations of the data stored in the pattern storage unit.

15 Claims, 7 Drawing Sheets

DRIVE ASSISTING APPARATUS

CROSS REFERENCE TO RELATED APPLICATIONS

This application is based on Japanese Patent Application (No. 2016-206252) filed on Oct. 20, 2016, the contents of which are incorporated herein by way of reference.

BACKGROUND

The present invention relates to a drive assisting apparatus for assisting a safe drive of a vehicle.

Although basically drivers try to drive vehicles safely, vehicles may be rendered in a dangerous situation without any intention or awareness of drivers or due to insufficient safety confirmation. For example, whereas a safe state of a certain level can be maintained as long as drivers are checking a forward scene, drivers may look aside when they are distracted to something. A dangerous situation tends to occur when drivers are looking aside. To prevent vehicles from being rendered in such a dangerous situation, various techniques have been developed conventionally.

For example, Patent document 1 discloses an inattentive drive judging apparatus which is equipped with a line-of-sight direction detection unit for detecting a direction of the line of sight of the driver on the basis of video of the driver taken by a vehicular camera. The apparatus is also equipped with an inattentive drive judging unit for judging that the driver is looking aside if the direction of his or her line of sight is out of a prescribed range.

Patent document 2 discloses a face direction detection apparatus which detects a face angle of the driver on the basis of video of the driver taken by a vehicular camera. A face direction angular velocity immediately before a time point when the face direction angle of the driver goes out of a detection range is stored. When it is judged that movement of a face region of the driver has been stopped, an estimated value of the face direction angle is calculated on the basis of the stored face direction angular velocity and an elapsed time.

[Patent document 1] JP-A-2012-22504
[Patent document 2] JP-A-2016-57839

SUMMARY

The present invention has been made in view of the above circumstances, and an object of the present invention is therefore to provide a drive assisting apparatus that serves to prevent occurrence of a dangerous situation due to a drive-related action of a driver.

To attain the above object, the invention provides drive assisting apparatus described below as items (i) to (v):

(i) A drive assisting apparatus characterized by comprising:
 a running state detection unit which detects a running state of a vehicle;
 a manipulation detection unit which detects a drive manipulation of a driver on the vehicle;
 a line-of-sight direction detection unit which detects a line-of-sight direction of the driver;
 a pattern storage unit which is stored in advance with data indicating combinations of a vehicle running state and a driver drive manipulation and a driver line-of-sight direction pattern; and
 a warning signal output unit which outputs a warning signal if a combination of the running direction detected by the running state detection unit, the drive manipulation detected by the manipulation detection unit, and the line-of-sight direction detected by the line-of-sight direction detection unit is different from any of the combinations of the data stored in the pattern storage unit.

(ii) The drive assisting apparatus according to item (i), characterized in:
 that the pattern storage unit is stored with, as the driver line-of-sight pattern, data indicating a prescribed region in which the line of sight of the driver should exist when the vehicle is running forward; and
 that the warning signal output unit outputs the warning signal if forward running of the vehicle is detected by the running state detection unit and a ratio of a period when the line-of-sight direction detected by the line-of-sight direction detection unit does not exist in the prescribed region is larger than or equal to a prescribed value.

(iii) The drive assisting apparatus according to item (i) or (ii), characterized in:
 that the manipulation detection unit detects a switching manipulation for switching a direction in which the vehicle is to start between a forward direction and a backward direction; and
 that the pattern storage unit is stored with, as the driver line-of-sight direction patterns, data indicating a line-of-sight direction variation pattern corresponding to switching to the forward direction and data indicating a line-of-sight direction variation pattern corresponding to switching to the backward direction.

(iv) The drive assisting apparatus according to any one of items (i) to (iii), characterized in:
 that the manipulation detection unit detects a manipulation for changing the running direction of the vehicle to a rightward direction or a leftward direction; and
 that the pattern storage unit is stored with, as the driver line-of-sight direction patterns, data indicating line-of-sight direction variation patterns corresponding to a rightward running direction change and a leftward running direction change, respectively.

(v) The drive assisting apparatus according to item (ii), characterized in that the warning signal output unit automatically selects a threshold value to be compared with the ratio of the period when the line-of-sight direction detected by the line-of-sight direction detection unit does not exist in the prescribed region, according to a vehicle state including a running speed of the vehicle.

DETAILED DESCRIPTION OF EXEMPLIFIED EMBODIMENTS

Figure 1:
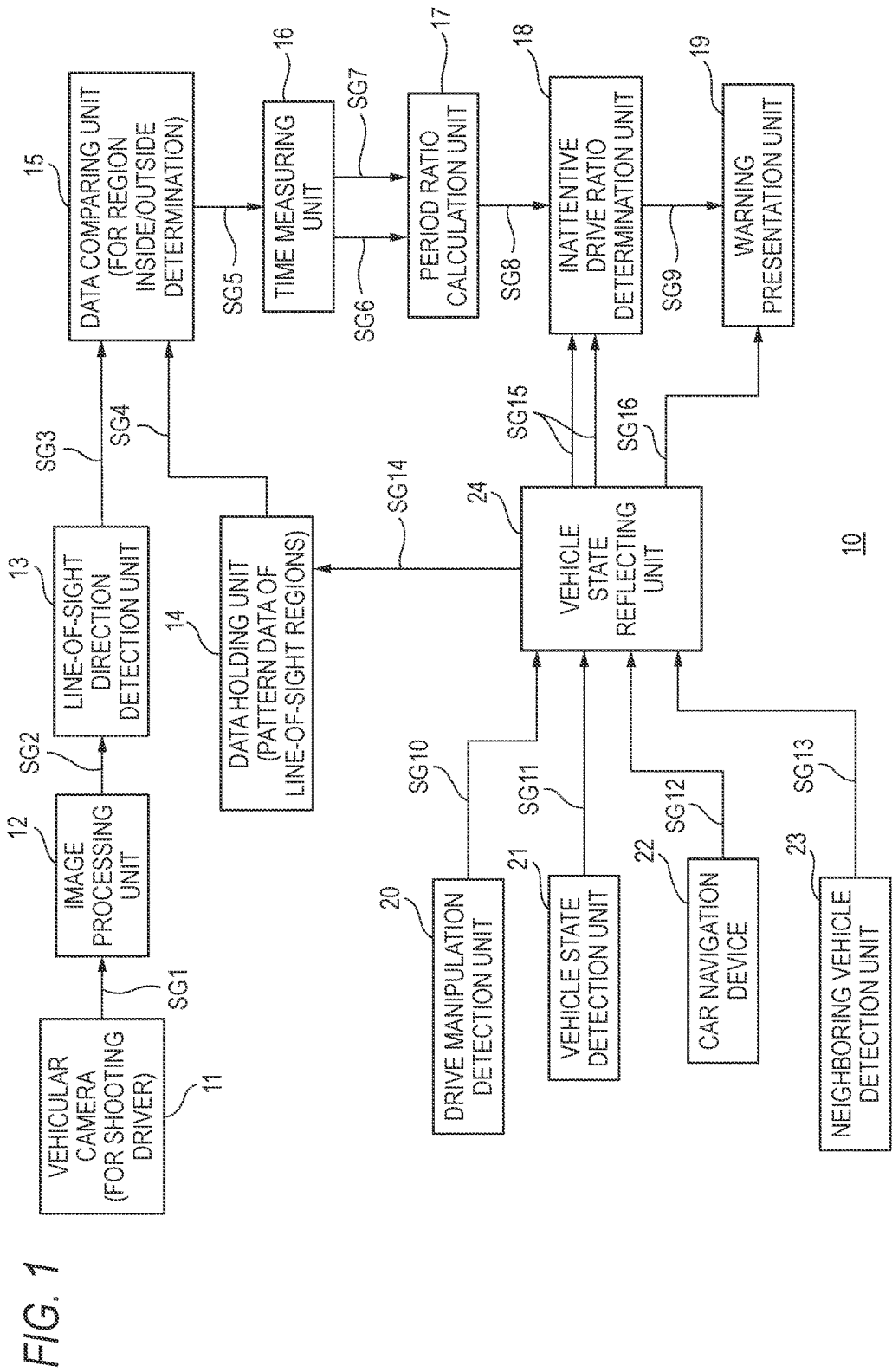
FIG. 1 is a block diagram showing an example configuration of a drive assisting apparatus according to a first embodiment of the present invention.

It is difficult to correctly determine whether a vehicle is in a dangerous situation. For example, even if a direction of the line of sight of the driver is detected correctly on the basis of video taken, it is difficult to determine whether the driver is looking aside on the basis of only the line-of-sight direction because the driver is in any of various situations.

One possible method is to output a warning with a judgment that the driver is looking aside if the line of sight of the driver has continued to deviate from the forward direction for a prescribed time or longer. However, there are situations that it is indispensable for safety for the driver to recognize a surrounding situation by deviating his or her line of sight from the forward direction. In such situations, an erroneous warning may be output by judging that the driver is looking aside on the basis of detected directions of his or her line of sight though the driver is not inattentive.

Even in a case that the driver is actually doing inattentive drive, the period that the line of sight of the driver is deviated from the forward direction does not exceed the prescribed time (threshold value) and no warning is output if the driver looks forward even instantaneously before the prescribed time is exceeded. Occurrence of a dangerous situation could not be avoided.

Another example dangerous situation that occurs without intension of the driver is that the vehicle starts in a direction that is opposite to a forward or backward direction intended by the driver. Thus, it is also very important to prevent an erroneous start. An erroneous start may occur in various manners. One example is that although the driver intends to start the vehicle forward or backward, actually the vehicle starts in the opposite direction because of the driver's erroneous manipulation of the shift lever. Another example is that the vehicle starts suddenly because the driver steps on the accelerator pedal though he or she intends to step on the brake pedal to stop the vehicle.

In driving a vehicle, it is very important for the driver to confirm safety by checking the surroundings visually when making such a drive manipulation as a start manipulation, a right or left turn, or a course change. However, whether such safety confirmation is done actually is up to the driver's intention; the driver may fail to do such safety confirmation, possibly encountering a dangerous situation.

The present invention has been made in view of the above circumstances, and an object of the present invention is therefore to provide a drive assisting apparatus that serves to prevent occurrence of a dangerous situation due to a drive-related action of a driver.

Specific embodiments of the present invention will be hereinafter described with reference to the drawings.

Embodiment 1

First, a drive assisting apparatus 10 according to a first embodiment will be outlined. The drive assisting apparatus 10 is provided with a function for assisting a safe drive of a driver utilizing information indicating a direction of the line of sight of the driver. More specifically, the drive assisting apparatus 10 automatically detects whether the driver of a vehicle that is installed with the drive assisting apparatus 10 is doing an inattentive drive and calls the driver's attention if it is judged that the vehicle is in a dangerous situation.

For example, while the vehicle is running ordinarily, the driver drives in such a manner as to direct his or her line of sight to within a certain region in his or her forward field of vision. On the other hand, if the driver is distracted to something, he or she may look aside, that is, direct his or her line or sight to a direction other than the forward direction.

Thus, a generally conceivable control would be such that times when the line of sight of the driver is in directions other than the forward direction are accumulated and a judgment that the driver is looking aside is made if the accumulated period exceeds a threshold value. However, this type of control cannot detect an inattentive drive with high accuracy. For example, even in a case that the driver is actually looking aside, it cannot be detected if the driver looks forward even instantaneously before the accumulated period exceeds the threshold value, because the accumulated period is cleared. For another example, if it takes long time for the driver to look in a direction other than the forward direction (e.g., right or left direction) to check a situation there for safety confirmation, an accumulation period may exceed the threshold value to cause erroneous detection of an inattentive drive though this act does not constitute an inattentive drive.

In view of the above, the drive assisting apparatus 10 according to the first embodiment employs the following characteristic control. A period when the line of sight exists in a particular line-of-sight region and a period when the line of sight does not exist in this region are detected and a ratio between these two periods is calculated. Whether an inattentive drive has occurred is judged by comparing the calculated ratio with threshold values.

With this measure, in, for example, a case that the driver does not look forward almost all the time, an inattentive drive can be detected reliably even if the driver looks forward only instantaneously during this period. Erroneous detection of an inattentive drive can be prevented when the driver does safety confirmation by setting a particular line-of-sight region so that it includes safety confirmation target directions.

Next, an example configuration of the drive assisting apparatus 10 will be described. FIG. 1 shows an example configuration of the drive assisting apparatus 10 according to the first embodiment of the invention.

As shown in FIG. 1, the drive assisting apparatus 10 is equipped with a vehicular camera 11, an image processing unit 12, a line-of-sight direction detection unit 13, a data holding unit 14, a data comparing unit 15, a time measuring unit 16, a period ratio calculation unit 17, an inattentive drive ratio determination unit 18, a warning presentation unit 19, a drive manipulation detection unit 20, a vehicle state detection unit 21, a car navigation device 22, a neighboring vehicle detection unit 23, and a vehicle state reflecting unit 24.

Among the components of the drive assisting apparatus 10, most of control elements are implemented by an electronic control unit (ECU) having a microcomputer as a main component and each control element corresponds to a software process executed by the microcomputer or a dedicated hardware element.

The vehicular camera 11 is a device for shooting the face of the driver who is sitting in the driver seat of the vehicle. Thus, the vehicular camera 11 is installed on, for example, a portion, in front of the driver seat, of the dashboard in such a manner that its shooting direction is directed to the face of the driver.

The image processing unit 12 converts a video signal SG1 that is output from the vehicular camera 11 into a digital signal and performs various kinds of image processing on it, such as extract various features, pattern recognition, and detection of a position and a size of a recognized pattern.

The line-of-sight direction detection unit 13 detects a direction of the line of sight of the driver on the basis of image information SG2 that is output from the image processing unit 12. This detection is performed by using a known technique. For example, as disclosed in paragraph "0016" of Patent document 1, recognition processing such as feature quantity calculation and shape judgment is performed in which detection targets are the right and left eyeballs of the driver found in a face image and a direction of the line of sight of the driver can be detected by performing prescribed line-of-sight detection processing on the basis of results of the above processing using center positions of the irises, center positions of Purkinje images produced by reflection of infrared light by the cornea surfaces, center positions of the eyeballs, or the like.

The data holding unit 14, which is a storage device such as a nonvolatile memory, holds pattern data of plural kinds of line-of-sight regions determined in advance. Each "line-of-sight region" means an ordinary region in which the line of sight of the driver is to exist in a state that he or she is not doing an inattentive drive. Specific examples of them will be described later.

The data comparing unit 15 compares line-of-sight direction information SG3 that is output from the line-of-sight direction detection unit 13 and line-of-sight region data SG4 that is output from the data holding unit 14, determines whether the direction indicated by the line-of-sight direction information SG3 is inside or outside the region indicated by the line-of-sight region data SG4, and outputs a determination result as a region inside/outside determination signal SG5. The region inside/outside determination signal SG5 is a binary signal and, for example, is at a high level if the line-of-sight direction is inside the line-of-sight region and at a low level if it is outside the line-of-sight region.

The time measuring unit 16 measures an accumulation period T1 when the line of sight is within a line-of-sight region and an accumulation period T1 when the line of sight is outside the line-of-sight region on the basis of the region inside/outside determination signal SG5 that is output from the data comparing unit 15. The time measuring unit 16 outputs the accumulation period T1 and the accumulation period T2 as inside-region period information SG6 and outside-region period information SG7, respectively.

The period ratio calculation unit 17 calculates a period ratio Rt on the basis of the inside-region period information SG6 and the outside-region period information SG7 that are output from the time measuring unit 16, according to the equation:

$$Rt=T2/(T1+T2).$$

And the period ratio calculation unit 17 outputs the calculated period ratio Rt as inattentive drive ratio information SG8. The period ratio Rt is updated as time elapses, that is, as the received inside-region period information SG6 or outside-region period information SG7 varies.

Alternatively, the period ratio calculation unit 17 may calculate an accumulation period T2 per unit as a period ratio Rt.

The inattentive drive ratio determination unit 18 at least discriminates between a safe state and an inattentive drive state by comparing the inattentive drive ratio information SG8, that is, the period ratio Rt, that is output from the period ratio calculation unit 17 with threshold values. The threshold values used in the inattentive drive ratio determination unit 18 are input from the vehicle state reflecting unit 24 as threshold value information SG15. The threshold value information SG15 includes two threshold values, that is, a lower limit value and an upper limit value. More specifically, the inattentive drive ratio determination unit 18 judges that the vehicle is in a safe state if the period ratio Rt is between the lower limit value and the upper limit value. If the period ratio Rt is smaller than the lower limit value or larger than the upper limit value, the inattentive drive ratio determination unit 18 judges that it is necessary to output a warning or call the driver's attention and outputs an inattentive drive determination signal SG9.

The warning presentation unit 19 outputs, when necessary, a warning or the like from a speaker (not shown) as a sound that can be heard by the driver on the basis of the inattentive drive determination signal SG9 that is output from the inattentive drive ratio determination unit 18. The warning presentation unit 19 switches among kinds of warning to be output from the warning presentation unit 19 on the basis of a degree-of-danger determination signal SG10 that is input from the vehicle state reflecting unit 24.

For example, when the degree of danger is high, the warning presentation unit 19 outputs a warning sound such as "peep-peep-peep" or a warning announcement of a simulated voice "You are in danger due to an inattentive drive." When the degree of danger is low, the warning presentation unit 19 outputs a confirmation sound such as "pi" or an attention-calling announcement such as "Take care not to do an inattentive drive."

The drive manipulation detection unit 20 detects various manipulations of the driver on the vehicle that are necessary for driving, such as right/left-turn manipulations, a winker lever manipulation at the time of a lane change, a brake pedal manipulation, and an accelerator pedal manipulation. The drive manipulation detection unit 20 outputs a drive manipulation information SG10 indicating a detected manipulation.

The vehicle state detection unit 21 acquires, from the vehicle, information indicating a current state of the self vehicle such as its running speed (km/h). In actuality, the vehicle state detection unit 21 can recognize a current state of the self vehicle by communicating with a higher-level electronic control unit installed in the vehicle or acquiring signals from various sensors installed in the vehicle. The vehicle state detection unit 21 outputs the acquired vehicle information as vehicle state information SG11.

The car navigation device 22 is provided with a function of generating particular area running information SG12 in addition to common car navigation functions. More specifically, when detecting that the self vehicle is approaching a particular area that is high in danger such as a predetermined point where many accidents occurred in the past or a school zone, the car navigation device 22 outputs particular area running information SG12 indicating it. For another example, the car navigation device 22 outputs particular area running information SG12 when detecting a rainfall or expected road freezing due to a snowfall.

The neighboring vehicle detection unit 23 detects other vehicles that are located in the vicinity of the self vehicle or approaching the self vehicle on the basis of images of a prescribed camera for shooting the neighborhood of the self vehicle or using a radar device for detecting other vehicles, and outputs neighboring vehicle detection information SG13. The neighboring vehicle detection information SG13 includes information indicating the number of other vehicles detected at the same time.

The vehicle state reflecting unit 24 generates the vehicle state determination information SG14, the threshold information SG15, and the degree-of-danger determination signal SG16. The vehicle state reflecting unit 24 causes the received drive manipulation information SG10, vehicle state information SG11, particular area running information SG12, and neighboring vehicle detection information SG13 to be reflected in the vehicle state determination information SG14, the threshold information SG15, and the degree-of-danger determination signal SG16. More specifically, the vehicle state reflecting unit 24 performs the following controls.

For example, the vehicle state reflecting unit 24 can discriminate among an ordinary running state, a right-turn running state, a left-turn running state, a lane change running state, etc. of the self vehicle on the basis of the drive manipulation information SG10. The vehicle state reflecting unit 24 generates vehicle state determination information SG14 to allow the data holding unit 14 to switch the shape and position of a line-of-sight region indicated by line-of-sight region data SG4 to be output according to the kind of running state such as ordinary running, right/left turn, or lane change.

The vehicle state reflecting unit 24 generates vehicle state determination information SG14 to allow the data holding unit 14 to switch the size of a line-of-sight region indicated by line-of-sight region data SG4 to be output according to the magnitude of vehicle speed information included in the vehicle state information SG11. For example, when the vehicle speed is lower than or equal to 30 km/h, the vehicle state reflecting unit 24 performs a control to cause the data holding unit 14 to select a wide line-of-sight region. When the vehicle speed is higher than or equal to 80 km/h, the vehicle state reflecting unit 24 performs a control to cause the data holding unit 14 to select a narrow line-of-sight region.

The vehicle state reflecting unit 24 automatically switches among the sets of threshold values of the threshold value information SG15 according to each of a variety of situations. For example, in a case that the vehicle is prone to be rendered in danger such as a case that the neighboring vehicle detection unit 23 has detected two or more other vehicles at the same time or the car navigation device 22 has detected that the self vehicle is approaching a point where many accidents occurred in the past or a school zone, the vehicle state reflecting unit 24 decreases the upper limit threshold value so that even a short-time inattentive drive causes output of a warning.

The vehicle state reflecting unit 24 controls the upper limit threshold value stepwise. For example, the upper limit threshold value is set at 80% in an ordinary state, decreased to 60% if the self vehicle has entered a school zone, and decreased to 40% if a person is detected around the self vehicle.

On the other hand, the lower limit threshold value is fixed at about 10%, for example. That is, if the inattentive drive period ratio Rt is shorter than or equal to 10% though the vehicle is not in a dangerous situation, it is highly probable that the driver is hardly looking at peripheral regions and is thinking about something other than driving. Thus, it is possible to prevent the vehicle from being rendered in a dangerous situation by urging the driver to take care and acquire information of peripheral regions.

The vehicle state reflecting unit 24 causes a danger level recognized on the basis of the drive manipulation information SG10, the vehicle state information SG11, the particular area running information SG12, and the neighboring vehicle detection information SG13 to be reflected in the output degree-of-danger determination signal SG16. As a result, the warning presentation unit 19 can output a warning that corresponds to a danger level.

For example, if the inattentive drive determination signal SG9 indicates that an inattentive drive has been detected (i.e., the period ratio Rt is lower than the lower limit value of the threshold information SG15 or higher than its upper threshold value) in a state that the degree-of-danger determination signal SG16 indicates that the degree of danger is high, the warning presentation unit 19 presents a strong warning by increasing the sound volume.

If the inattentive drive determination signal SG9 indicates that an inattentive drive has been detected (i.e., the period ratio Rt is lower than the lower limit value of the threshold information SG15 or higher than its upper threshold value) in a state that the degree-of-danger determination signal SG16 indicates that the degree of danger is low, the warning presentation unit 19 presents a moderate warning or calls the driver's attention moderately by, for example, decreasing the sound volume.

Figure 2:
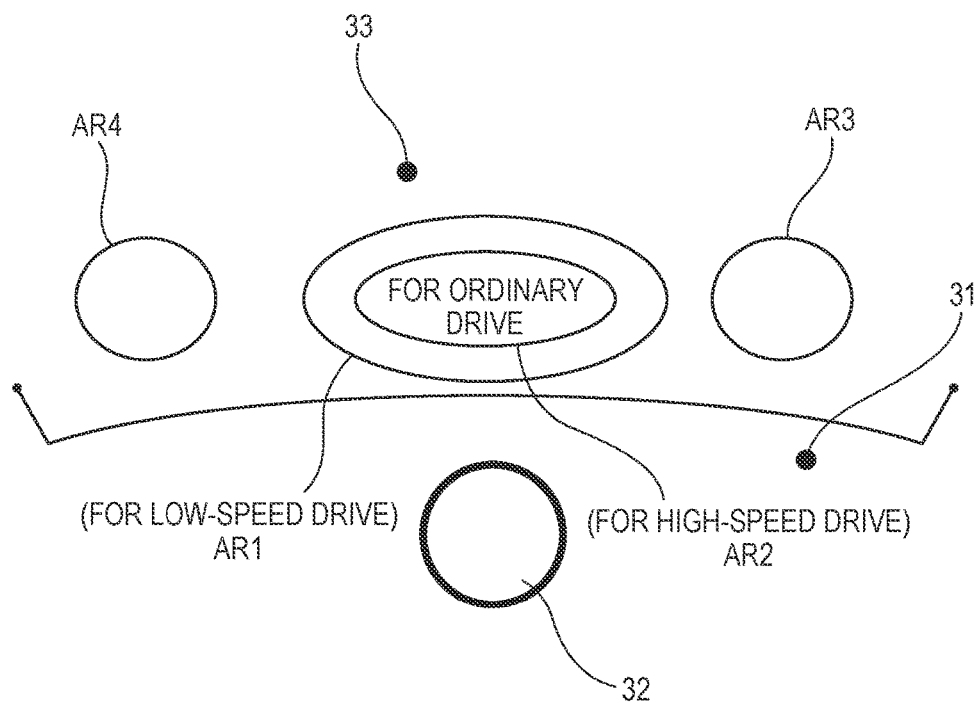
FIG. 2 shows specific example relationships between a scene that appears in a field of vision of the driver when he or she looks forward from the viewing point and line-of-sight regions.

Next, specific examples of line-of-sight regions will be described. FIG. 2 shows specific example relationships between a scene that appears in a field of vision of the driver when he or she looks forward from the viewing point and line-of-sight regions.

As shown in FIG. 2, a steering wheel 32 exists in front of the driver and a dashboard 31 lies in front of the steering wheel 32 (in the vehicle compartment). The driver can see a scene in a front field of vision 33 through a transparent windshield (window glass) that is located above the dashboard 31.

While the driver is driving the vehicle ordinarily, that is, he or she is driving the vehicle so that it runs straightly forward, it is highly probable that the line of sight of the driver is in a region that is approximately centered at the center of the front field of vision 33 and has a certain expanse.

In view of the above, as shown in FIG. 2, a low-speed ordinary driving line-of-sight region AR1 and a high-speed ordinary driving line-of-sight region AR2 which are both generally elliptical are set around the center of the front field of vision 33. When the vehicle is running at a relatively high speed, there is a tendency that the line of sight of the driver tends to be directed to a smaller region around the center of the front field of vision 33. Conversely, when the vehicle is running at a relatively low speed, the probability that the line of sight of the driver is also directed to positions distant from the center of the front field of vision 33 is higher. In view of these tendencies, the high-speed ordinary driving line-of-sight region AR2 is set relatively small and the low-speed ordinary driving line-of-sight region AR1 is set larger than the high-speed ordinary driving line-of-sight region AR2.

On the other hand, in turning the vehicle right or changing to a right adjoining lane, the driver needs to check a situation on the right side of the self vehicle for safety confirmation and hence the probability that his or her line of sight is directed to a right-hand region of the front field of vision 33 is high. Conversely, in turning the vehicle left or changing to a left adjoining lane, the driver needs to check a situation on the left side of the self vehicle for safety confirmation and hence the probability that his or her line of sight is directed to a left-hand region of the front field of vision 33 is high.

In view of the above, as shown in FIG. 2, a right-turn line-of-sight region AR3 and a left-turn line-of-sight region AR4 are set at a right-hand position and a left-hand position of the front field of vision 33, respectively. The right-turn line-of-sight region AR3 is made a circular or elliptical region that is centered at a reference point of positions the driver should pay attention to in doing right-turn safety confirmation and has a certain expanse. The left-turn line-of-sight region AR4 is made a circular or elliptical region that is centered at a reference point of positions the driver should pay attention to in doing left-turn safety confirmation and has a certain expanse.

Line-of-sight regions may be set in various manners other than shown in FIG. 2. For example, separate line-of-sight regions that are different from each other in position and size may be set for a right turn and a rightward lane change. Likewise, separate line-of-sight regions that are different from each other in position and size may be set for a left turn and a leftward lane change. Furthermore, as in the case of the low-speed ordinary driving line-of-sight region AR1 and the high-speed ordinary driving line-of-sight region AR2, the size of each of the right-turn line-of-sight region AR3 and the left-turn line-of-sight region AR4 may be changed according to the vehicle speed.

In actuality, the line-of-sight regions AR1-AR4 shown in FIG. 2 are used selectively in the following manner. If the vehicle state reflecting unit 24 shown in FIG. 1 judges that the self vehicle is an ordinary running state, the vehicle state reflecting unit 24 generates a vehicle state determination information SG14 so that the low-speed ordinary driving line-of-sight region AR1 or the high-speed ordinary driving line-of-sight region AR2 will be selected according to the vehicle speed. The data holding unit 14 selects the low-speed ordinary driving line-of-sight region AR1 or the high-speed ordinary driving line-of-sight region AR2 according to the vehicle state determination information SG14 and outputs line-of-sight region data SG4 indicating the selected one.

If the vehicle state reflecting unit 24 shown in FIG. 1 judges that the self vehicle is going to turn right, the vehicle state reflecting unit 24 generates a vehicle state determination information SG14 so that the right-turn line-of-sight region AR3 will be selected. The data holding unit 14 selects the right-turn line-of-sight region AR3 according to the vehicle state determination information SG14 and outputs line-of-sight region data SG4 indicating it.

If the vehicle state reflecting unit 24 shown in FIG. 1 judges that the self vehicle is going to turn left, the vehicle state reflecting unit 24 generates a vehicle state determination information SG14 so that the left-turn line-of-sight region AR4 will be selected. The data holding unit 14 selects the left-turn line-of-sight region AR4 according to the vehicle state determination information SG14 and outputs line-of-sight region data SG4 indicating it.

<Example of Variation of Inattentive Drive Ratio Information SG8 and Recognition of Inattentive Drive>

Figure 3:
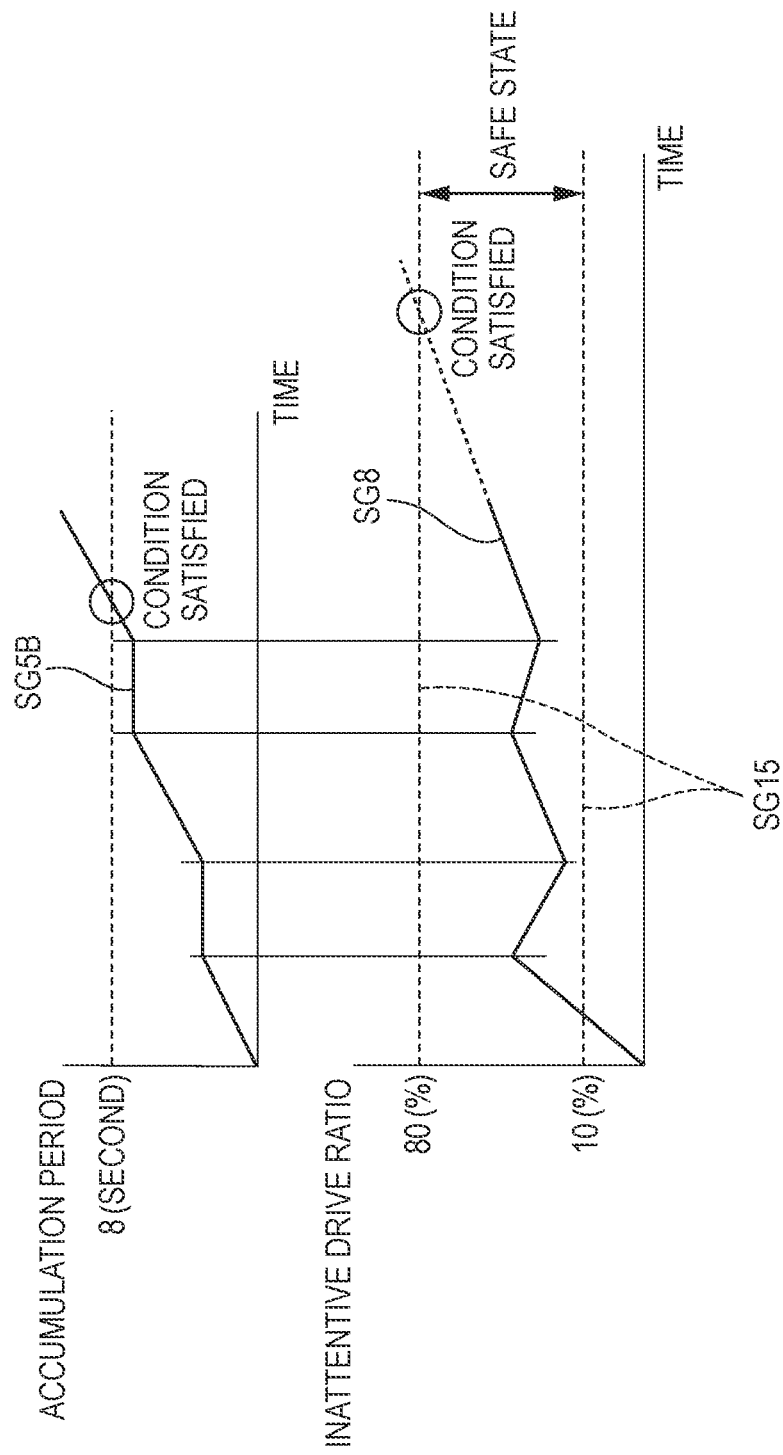
FIG. 3 is time charts showing examples of variations of inattentive drive ratio information SG8 and an accumulation period SG5B of a state that the line of sight is outside a line-of-sight region.

FIG. 3 shows examples of variations of inattentive drive ratio information SG8 and an accumulation period SG5B of a state that the line of sight is outside a line-of-sight region. The drive assisting apparatus 10 shown in FIG. 1 does not employ the accumulation period SG5B that may be employed in common controls. Instead, the drive assisting apparatus 10 performs a characteristic control, that is, detects an inattentive drive on the basis of an inattentive drive ratio (i.e., period ratio Rt) of the inattentive drive ratio information SG8.

The example shown in FIG. 3 assumes a case that the upper limit threshold value and the lower limit threshold value of threshold value information SG15 are 80% and 10%, respectively. Thus, the inattentive drive ratio determination unit 18 judges that the vehicle is in a safe state, that is, a non-inattentive drive state, if the period ratio Rt of the inattentive drive ratio information SG8 is between the upper limit threshold value 80% and the lower limit threshold value 10% of the threshold value information SG15. On the other hand, the inattentive drive ratio determination unit 18 judges that the vehicle is in an abnormal state such as an inattentive drive state if the period ratio Rt is higher than the upper limit threshold value 80% or lower than the lower limit threshold value 10%.

<Advantages of Drive Assisting Apparatus 10>

If the accumulation period SG5B is monitored and compared with a threshold value (e.g., 8 sec), since the accumulation period SG5B increases as time elapses as shown in FIG. 3, it is highly probable that an inattentive drive is detected though the driver is not doing an inattentive drive. In contrast, in the drive assisting apparatus 10, since the period ratio Rt of the inattentive drive ratio information SG8 is compared with the threshold values, an abnormality is not detected unless the period ratio Rt goes out of the safe range (e.g., 10% to 80%). The accuracy of detection of an inattentive drive is therefore increased.

Furthermore, since the period ratio Rt is compared with the lower limit threshold value (e.g., 10%), it is possible to detect an abnormality and call the driver's attention even in a case that the driver is paying almost no attention to the situation around the self vehicle as in a case that the driver is thinking about something other than driving. This enables an escape from a dangerous situation.

Embodiment 2

First, a drive assisting apparatus 10B according to a second embodiment will be outlined. The drive assisting apparatus 10B is provided with a drive assist function for preventing an erroneous start of a vehicle utilizing information indicating a direction of the line of sight of the driver.

More specifically, whether an erroneous start is being made is judged automatically by the drive assisting apparatus 10B by judging whether a starting direction (forward or backward) intended by the driver of the vehicle installed with the drive assisting apparatus 10B coincides with a direction in which the vehicle is going to start actually. If danger is expected, the drive assisting apparatus 10B outputs a warning or performs a control so that the vehicle starts in the safe direction.

A line-of-sight direction of the driver who intends to start the vehicle forward and a line-of-sight direction of the driver who intends to start the vehicle backward are different from each other very much. It is therefore possible to infer an intension (forward start or backward start) of the driver on the basis of a detected line-of-sight direction of the driver. On the other hand, it is possible to determine a direction (forward or backward) in which the vehicle is going to start actually on the basis of a state of the transmission installed in the vehicle or a manipulation state of the shift lever which commands a shift position. Thus, an erroneous forward or backward start can be prevented by comparing intension of the driver and a direction in which the vehicle is going to start actually.

Figure 4:
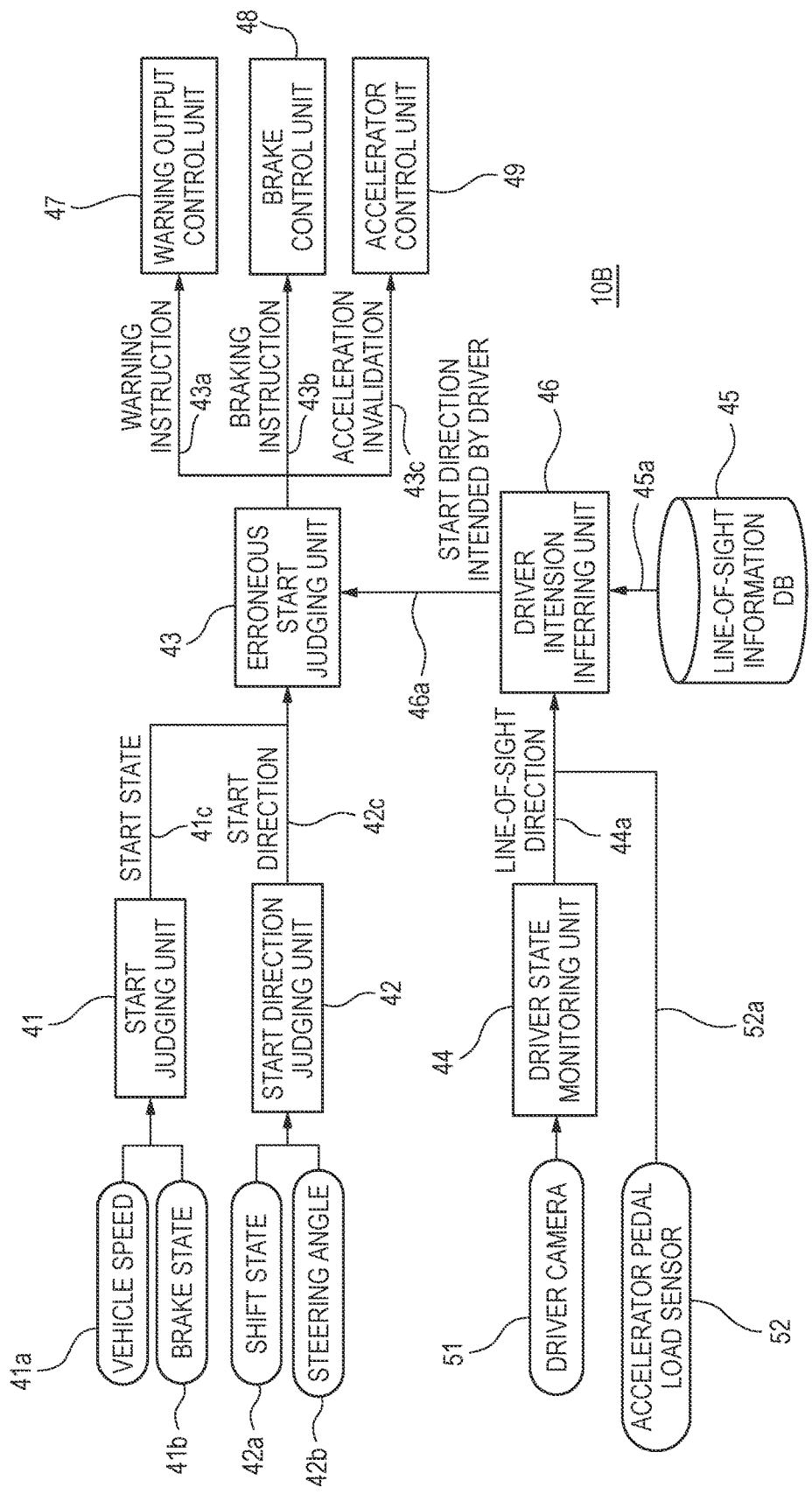
FIG. 4 is a block diagram showing an example configuration of a drive assisting apparatus according to a second embodiment of the invention.

Next, an example configuration of the drive assisting apparatus 10B will be described. FIG. 4 shows an example configuration of the drive assisting apparatus 10B according to the second embodiment of the invention.

As shown in FIG. 4, the drive assisting apparatus 10B is equipped with a start judging unit 41, a start direction judging unit 42, an erroneous start judging unit 43, a driver state monitoring unit 44, a line-of-sight information database (DB) 45, a driver intension inferring unit 46, a warning output control unit 47, a brake control unit 48, an accelerator control unit 49, a driver camera 51, and an accelerator pedal load sensor 52.

Among the components of the drive assisting apparatus 10B, most of control elements are implemented by an electronic control unit (ECU) having a microcomputer as a main component and each control element corresponds to a software process executed by the microcomputer or a dedicated hardware element.

Information 41a indicating a running speed of the vehicle and information 41b indicating a brake on/off state of the vehicle are input to the start judging unit 41 from a vehicular sensor or an electronic control unit. The start judging unit 41 judges a current (i.e., actual) start state of the vehicle on the basis of the received pieces of information, and outputs a signal 41c indicating it.

Information 42a indicating a current shift state of an automatic transmission of the vehicle and information 42b indicating a current steering angle of a steering mechanism of the vehicle are input to the start direction judging unit 42 from a vehicular sensor or an electronic control unit. The start direction judging unit 42 judges a current start direction of the vehicle on the basis of the received pieces of information (each of which corresponds to a manipulation of the driver), and outputs a signal 42c indicating it.

The erroneous start judging unit 43 automatically judges whether the vehicle is making an erroneous start on the basis of the signal 41c which is output from the start judging unit 41 and indicates a start state, the signal 42c which is output from the start direction judging unit 42 and indicates a start direction, and a signal 46a which is output from the driver intension inferring unit 46 and indicates a start direction intended by the driver. On the basis of a judgment result, the erroneous start judging unit 43 outputs a signal 43a indicating a warning instruction, a signal 43b indicating a braking instruction, and a signal 43c indicating an acceleration invalidation instruction.

The driver state monitoring unit 44 receives a video signal that is output from the driver camera 51, and monitors the state of the driver on the basis of the received video signal. The driver camera 51 is a device for shooting the face of the driver who is sitting in the driver seat of the vehicle. Thus, the driver camera 51 is installed on, for example, a portion, in front of the driver seat, of the dashboard in such a manner that its shooting direction is directed to the face of the driver. The driver state monitoring unit 44 detects a direction of the line of sight, a blink, etc. of the driver on the basis of video containing the face of the driver and other things, and outputs a signal 44a indicating a line-of-sight direction.

The accelerator pedal load sensor 52, which is installed on the accelerator pedal of the vehicle, detects whether a foot of the driver is placed on the accelerator pedal and outputs an accelerator pedal state signal 52a indicating a load imposed on the accelerator pedal. The accelerator pedal load sensor 52 can also detect a state that the accelerator pedal is not stepped on and a foot of the driver is merely placed on it.

The line-of-sight information database 45, which is implemented in a storage device such as a nonvolatile memory, holds data indicating general line-of-sight variation patterns of a driver in their vehicle driving actions.

The driver intension inferring unit 46 judges whether a foot of the driver is placed on the accelerator pedal on the basis of the accelerator pedal state signal 52a, and infers whether the driver intends to start the vehicle. The driver intension inferring unit 46 compares the signal 44a indicating an actual line-of-sight direction of the driver with data 45a that are read out from the line-of-sight information database 45 and indicate general line-of-sight variation patterns of a driver, and thereby outputs a signal 46a indicating a vehicle start direction (forward or backward) intended by the driver.

The warning output control unit 47 outputs a prescribed warning in response to the signal 43a indicating a warning instruction that is output from the erroneous start judging unit 43. More specifically, the warning output control unit 47 outputs a warning sound or announces a simulated voice message such as "The vehicle is in danger of an erroneous start."

The brake control unit 48 performs automatic braking to prevent a start of the vehicle in response to the signal 43b indicating a braking instruction that is output from the erroneous start judging unit 43. The accelerator control unit 49 performs an invalidation control so that stepping on the accelerator pedal will not cause a resulting vehicle operation in response to the signal 43c indicating an acceleration invalidation instruction that is output from the erroneous start judging unit 43.

Next, example operations of the drive assisting apparatus 10B will be described.

<Operation 1: The Driver Intends a Forward Start but Actually the Vehicle is Starting Backward>

Step Sa1: If the driver is looking forward carefully, the driver intension inferring unit 46 infers that the driver intends a forward start by comparing line-of-sight direction information (signal 44a) with the data 45a indicating the general line-of-sight variation patterns of a driver and outputs a signal 46a indicating the inferred start direction.

Step Sa2: If the shift position of the transmission becomes "R: rear" in response to a shift manipulation of the driver, the start direction judging unit 42 detects a start direction "backward" and outputs a signal 42c that reflects the detected start direction.

Step Sa3: If the braking is stopped by a drive manipulation of the driver, the start judging unit 41 judges that the driver is starting the vehicle. Furthermore, since the start direction indicated by the signal 46a that was output at step Sa1 is different from that indicated by the signal 42c that was output at step Sa2, the erroneous start judging unit 43 judges that an erroneous start is being made and outputs a warning instruction (signal 43a), a braking instruction (signal 43b), and an acceleration invalidation instruction (signal 43c).

Step Sa4: The warning output control unit 47 outputs a warning in response to the warning instruction (signal 43a). At the same time, the braking control unit 48 automatically activates braking in response to the braking instruction (signal 43b) and the accelerator control unit 49 invalidates an acceleration manipulation in response to the acceleration invalidation instruction (signal 43c). With these operations, it is possible to warn the driver before a start that the vehicle is in danger of an erroneous start and to prevent an erroneous start by the automatic braking control and the acceleration invalidation.

<Operation 2: The Driver Intends a Backward Start but Actually the Vehicle is Starting Forward>

Step Sb1: If the driver looks at a side mirror or the rearview mirror to check a rear situation, the driver intension inferring unit 46 infers that the driver intends to a backward start by comparing line-of-sight direction information (signal 44a) with the data 45a indicating the general line-of-sight variation patterns of a driver that are output from the line-of-sight information database 45 and outputs a signal 46a indicating the inferred start direction.

Step Sb2: If the shift position of the transmission becomes "D: drive" in response to a shift manipulation of the driver, the start direction judging unit 42 detects a start direction "forward" and outputs a signal 42c that reflects the detected start direction.

Step Sb3: If the braking is stopped by a drive manipulation of the driver, the start judging unit 41 judges that the driver is starting the vehicle. Furthermore, since the start direction indicated by the signal 46a that was output at step Sb1 is different from that indicated by the signal 42c that was output at step Sb2, the erroneous start judging unit 43 judges that an erroneous start is being made and outputs a warning instruction (signal 43a), a braking instruction (signal 43b), and an acceleration invalidation instruction (signal 43c).

Step Sb4: The warning output control unit 47 outputs a warning in response to the warning instruction (signal 43a). At the same time, the braking control unit 48 automatically activates braking in response to the braking instruction (signal 43b) and the accelerator control unit 49 invalidates an acceleration manipulation in response to the acceleration invalidation instruction (signal 43c). With these operations, it is possible to warn the driver before a start that the vehicle is in danger of an erroneous start and to prevent an erroneous start by the automatic braking control and the acceleration invalidation.

<Advantages of Drive Assisting Apparatus 10B>

One conceivable method for preventing a traffic accident due to an erroneous start of a vehicle would be to install, in the vehicle, various sensors for detecting an obstacle or persons located ahead in a starting direction. In contrast, where the drive assisting apparatus 10B is employed, an erroneous start can be prevented without installing such sensors and it is not necessary to take the probability of a sensor malfunction into consideration. An erroneous start can be prevented even in a case that no obstacle exists ahead in a starting direction. Furthermore, since the driver is warned about a possible erroneous start and braking and acceleration are controlled automatically, a psychological burden on the driver of worrying about a possible drive manipulation error can be lowered.

Embodiment 3

First, a drive assisting apparatus 10C according to a third embodiment will be outlined.

In, for example, turning the vehicle right or left or changing to a right or left adjoining lane, the driver needs to check, visually, in advance, a surrounding situation such as a situation on the right side or the left side of the self vehicle for safety confirmation. In particular, since the field of vision of the driver who is sitting in the driver seat has dead angle regions, the driver is desired to do safety confirmation with sufficient care (e.g., taking a sufficient time) so that he or she can also check dead angle regions.

The drive assisting apparatus 10C according to the third embodiment is provided with a drive assisting function for detecting whether the driver is failing to do safety confirmation utilizing information indicating a direction of the line of sight of the driver and outputting a warning or the like upon occurrence of a dangerous situation such as a situation that necessary safety confirmation has not been done.

Figure 5:
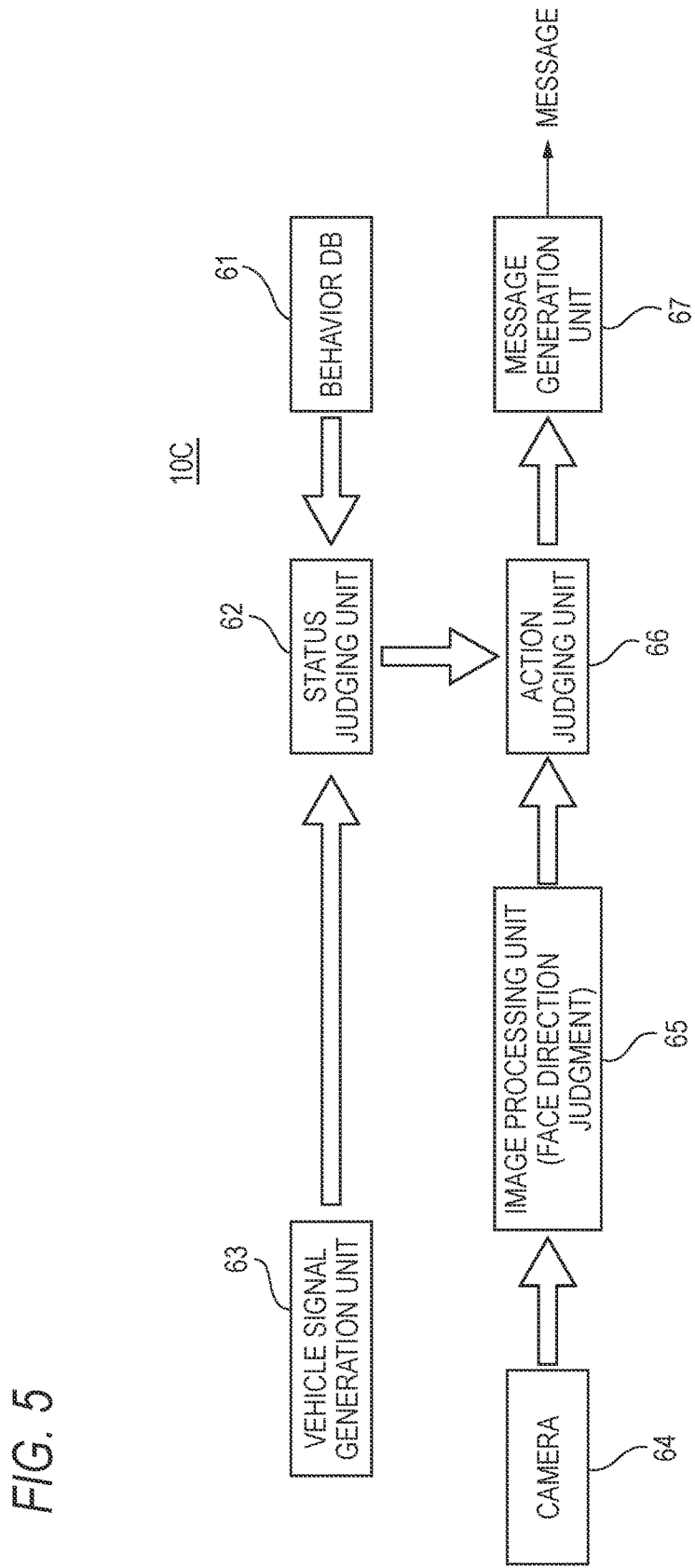
FIG. 5 is a block diagram showing an example configuration of a drive assisting apparatus according to a third embodiment of the invention.

Next, an example configuration of the drive assisting apparatus 10C will be described, FIG. 5 shows an example configuration of the drive assisting apparatus 10C according to the third embodiment of the invention.

As shown in FIG. 5, the drive assisting apparatus 10C is equipped with a behavior database (DB) 61, a status judging unit 62, a vehicle signal generation unit 63, a camera 64, an image processing unit 65, an action judging unit 66, and a message generation unit 67.

Among the components of the drive assisting apparatus 10C, most of control elements are implemented by an electronic control unit (ECU) having a microcomputer as a main component and each control element corresponds to a software process executed by the microcomputer or a dedicated hardware element.

The behavior database 61 is implemented in a storage device such as a nonvolatile memory. Data held by the behavior database 61 correspond to general behavior (manipulation) patterns of a driver in turning a vehicle right or left, making a lane change, or making a like manipulation and indicate variation patterns of various signals generated in the vehicle.

The vehicle signal generation unit 63 generates various signals indicating a vehicle state using various sensors and switches installed in the vehicle. The vehicle signal generation unit 63 is typically configured so as to generate a braking-on/off signal, a vehicle speed signal, a right/left turn signal, a steering angle signal, etc.

The status judging unit 62 infers a current driving action status of the driver by comparing variations of the various signals that are output from the vehicle signal generation unit 63 with variation patterns of various reference data held by the behavior database 61. That is, the status judging unit 62 infers a current driving action status of the driver in such a manner that a right-turn action, a left-turn action, and a lane change action can be discriminated from each other.

The camera 64 is a device for shooting the face of the driver who is sitting in the driver seat of the vehicle. Thus, the camera 64 is installed on, for example, a portion, in front of the driver seat, of the dashboard in such a manner that its shooting direction is directed to the face of the driver. The image processing unit 65 detects a direction of the face of the driver by analyzing an output of the camera 64, that is, video containing the face of the driver and other things, and calculates a direction of the face of the driver. A direction of the line of sight of the driver may be detected instead of a direction of the face.

The action judging unit 66 recognizes a current driving action status of the driver such as a right turn, a left turn, or a lane change on the basis of a judgment result of the status judging unit 62. Furthermore, the action judging unit 66 monitors the direction of the face of the driver that is detected by the image processing unit 65 and judges whether the driver is doing a proper safety confirmation act. If not detecting proper safety confirmation of the driver, the action judging unit 66 judges that the driver is failing to do safety confirmation and instructs the message generation unit 67 to output a message.

When receiving a message output instruction from the action judging unit 66, the message generation unit 67 outputs a prescribed warning sound or a prescribed voice message in such a manner that it can be heard by the driver. Where the vehicle is installed with a drive recording device such as a drive recorder or a digital tacograph, an operation mode is conceivable that the message generation unit 67 outputs a log of messages in such a manner that it can be recorded by the drive recorder or the digital tacograph.

Next, example operations of the drive assisting apparatus 10C will be described.

<Operation 1>

Figure 6:
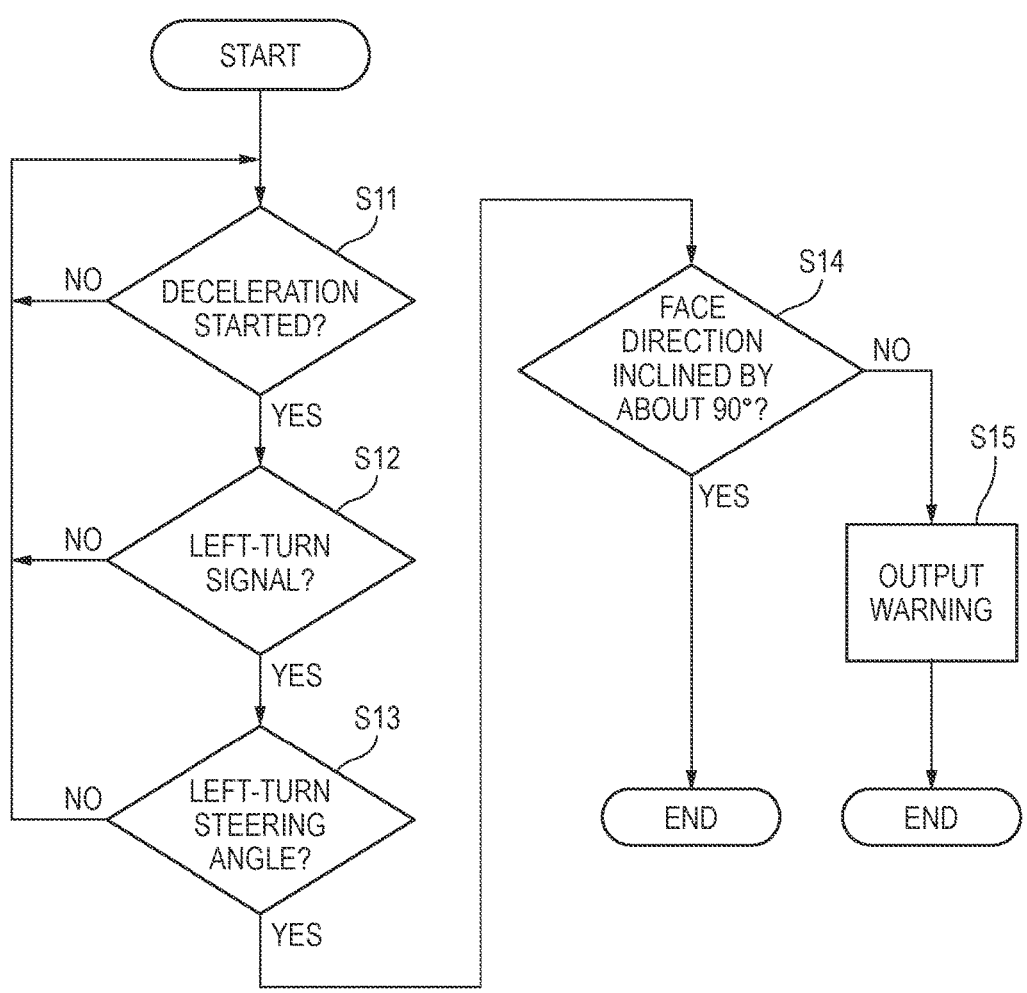
FIG. 6 illustrates an example operation that the drive assisting apparatus performs when the vehicle turns left.

FIG. 6 illustrates an example operation that the drive assisting apparatus 100 performs when the vehicle turns left.

Step S11: On the basis of a braking-on signal or a vehicle speed signal that is output from the vehicle signal generation unit 63, the status judging unit 62 judges whether the driver is making a deceleration act. If the judgment result is affirmative, the process moves to step S12.

Step S12: The status judging unit 62 judges whether the driver is making a left-turn action. If an affirmative judgment is made on the basis of a left-turn signal that is output from the vehicle signal generation unit 63, the process moves to step S13.

Step S13: On the basis of a steering angle signal that is output from the vehicle signal generation unit 63, the status judging unit 62 judges whether the driver is making a left-turn action. If the judgment result is affirmative, the process moves to step S14.

At steps S11-S13, the status judging unit 62 judges whether the drive action the driver is making is a left-turn action by comparing a variation pattern of each signal that is input from the vehicle signal generation unit 63 with the variation patterns of the various reference data held by the behavior database 61.

Step S14: The action judging unit 66 monitors face direction information that is output from the image processing unit 65 until a left turn of the self vehicle is started actually, and judges whether the driver has done safety confirmation for a left-turn dead angle region (i.e., a neighborhood on the front-left of (and below) the vehicle body). For example, if the face direction is inclined by about 90° (i.e., the driver is looking leftward), the action judging unit 66 judges that the driver is checking an obstacle or the like located on the left of the vehicle and the process is finished. If the face direction is inclined by less than 90°, the action judging unit 66 judges that the safety confirmation for the dead angle region is insufficient and the process moves to step S15.

Step S15: Since the safety confirmation for the left-turn dead angle region is insufficient, the message generation unit 67 outputs a warning on the basis of a control signal that is output from the action judging unit 66. This makes it possible to call the drivers attention.

For example, when such a vehicle as a large-size truck turns left, a traffic accident tends to occur that it hits or runs over a person, a bicycle, a motorcycle, or the like existing in its neighborhood on the front-left side of and below it. It is therefore very important for the driver to do visual safety confirmation for that dead angle region. Where the drive assisting apparatus 10C performs the control illustrated by FIG. 6, a warning can be output by automatically detecting the driver's failing to do safety confirmation in making a left turn.

It is noted that steps S11 and S12 shown in FIG. 6 may be executed in the opposite order or at the same time.

<Operation 2>

Figure 7:
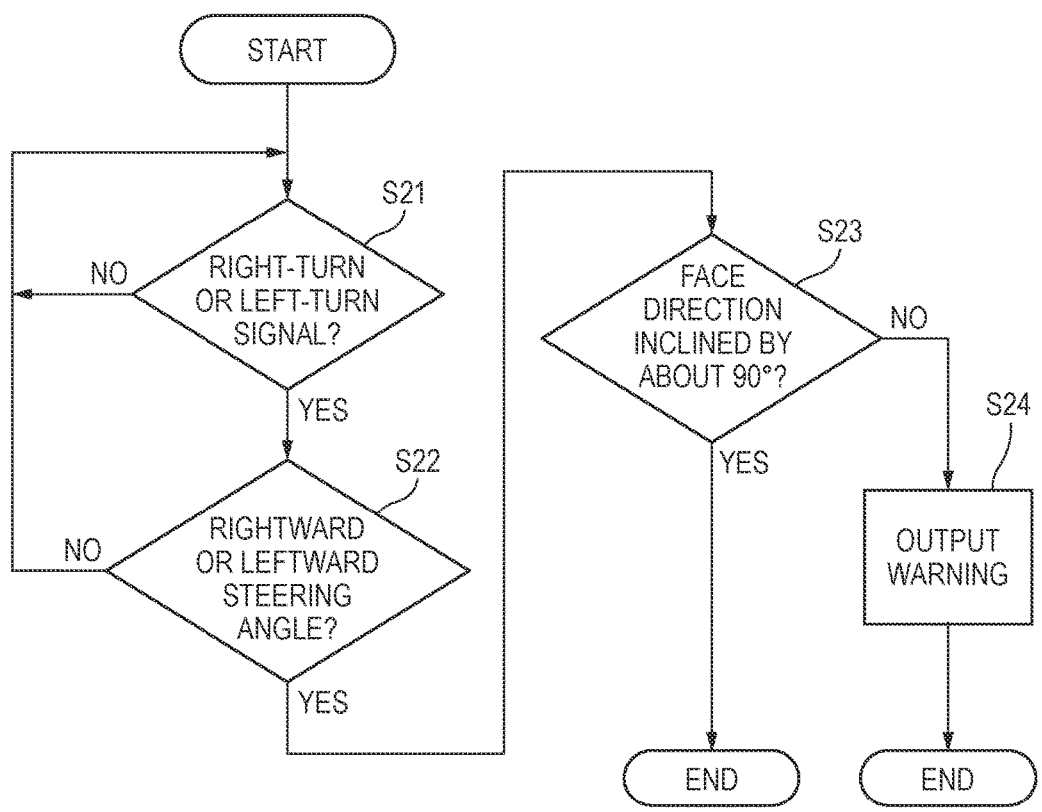
FIG. 7 illustrates an example operation that the drive assisting apparatus performs when the vehicle makes a lane change.

FIG. 7 shows an operation example that the drive assisting apparatus 10C performs when the vehicle makes a lane change.

Step S21: If the status judging unit 62 detects a left-turn signal or a right-turn signal that is output from the vehicle signal generation unit 63 while the vehicle is running, the process moves to step S22.

Step S22: The status judging unit 62 judges whether the driver is making an action for changing to a right or left adjoining lane on the basis of a steering angle signal that is output from the vehicle signal generation unit 63. If an affirmative judgment is made, the process moves to step S23. This judgment can be made with high accuracy by comparing a variation pattern of the signal that is output from the vehicle signal generation unit 63 with the variation patterns of the reference data held by the behavior database 61.

Step S23: The action judging unit 66 monitors face direction information that is output from the image processing unit 65 until a lane change of the self vehicle is started actually, and judges whether the driver has done safety confirmation for a right or left lane change dead angle region (i.e., a neighborhood on the right or left of the vehicle body). For example, if the face direction is inclined by about 90° (i.e., the driver is looking rightward or leftward), the action judging unit 66 judges that the driver is checking another vehicle or the like running along the adjoining destination lane and the process is finished. If the face direction is inclined by less than 90°, the action judging unit 66 judges that the safety confirmation for the dead angle region is insufficient and the process moves to step S24.

Step S24: Since the safety confirmation for the lane change dead angle region is insufficient, the message generation unit 67 outputs a warning on the basis of a control signal that is output from the action judging unit 66. This makes it possible to call the driver's attention.

For example, when the vehicle is changing to a right adjoining lane, another vehicle may be running along that lane. However, if the other vehicle running along the adjoining destination lane is located in the dead angle region, the driver of the self vehicle cannot visually recognize the other vehicle as long as he or she merely checks a scene appearing on the rearview mirror or the side mirror. It is therefore very important for the driver to check for another vehicle directly through his or her eyes (i.e., without using either mirror) by directing his or her face rightward. Where the drive assisting apparatus 10C performs the control illustrated by FIG. 7, a warning can be output by automatically detecting the driver's failing to do safety confirmation in making a lane change.

<Advantages of Drive Assisting Apparatus 10C>

It is possible to detect the driver's failure to do safety confirmation in making each of a right turn, a left turn, and a lane change and to output a related warning. As such, the drive assisting apparatus 10C serves to prevent such traffic accidents as hitting or running over a pedestrian, a bicycle, or the like in making a left turn, hitting a pedestrian, a bicycle, or the like in making a right turn, or colliding with another vehicle in making a lane change.

If the driver of the self vehicle has done a prescribed safety confirmation act properly in making a right turn, a left turn, a lane change, or the like, no warning is output and hence the driver is not annoyed by a warning sound. Since the functions of the drive assisting apparatus 10C can be realized using common signals of the vehicle and video generated by the camera 64, the drive assisting apparatus 10C need not be installed with special, expensive sensors etc. and hence can be implemented at a low price.

The use of the drive assisting apparatus 10C makes it possible to correct actions of a driver who tends to fail to do safety confirmation and to improve his or her attitude toward doing safety confirmation. Furthermore, by cooperating with such a vehicular device as a drive recorder or a digital tacograph, it becomes possible to record failures to do safety confirmation, which allows a company that runs business vehicles to produce data that are useful as a guide for safety driving.

The features of the drive assisting apparatus according to the embodiment of the invention will now be summarized concisely as items (i) to (v) below:

(i) A drive assisting apparatus (10) characterized by comprising:
a running state detection unit (vehicle state detection unit 21) which detects a running state of a vehicle;
a manipulation detection unit (drive manipulation detection unit 20) which detects a drive manipulation of a driver on the vehicle;
a line-of-sight direction detection unit (13) which detects a line-of-sight direction of the driver;
a pattern storage unit (data holding unit 14) which is stored in advance with data indicating combinations of a vehicle running state and a driver drive manipulation and a driver line-of-sight direction pattern; and
a warning signal output unit (warning presentation unit 19) which outputs a warning signal if a combination of the running direction detected by the running state detection unit, the drive manipulation detected by the manipulation detection unit, and the line-of-sight direction detected by the line-of-sight direction detection unit is different from any of the combinations of the data stored in the pattern storage unit.

(ii) The drive assisting apparatus according to item (i), characterized in:
that the pattern storage unit is stored with, as the driver line-of-sight pattern, data indicating a prescribed region in which the line of sight of the driver should exist when the vehicle is running forward; and
that the warning signal output unit outputs the warning signal if forward running of the vehicle is detected by the running state detection unit and a ratio (Rt) of a period when the line-of-sight direction detected by the line-of-sight direction detection unit does not exist in the prescribed region (line-of-sight regions AR1-AR4) is larger than or equal to a prescribed value.

(iii) The drive assisting apparatus according to item (i) or (ii), characterized in:
that the manipulation detection unit (start direction judging unit 42) detects a switching manipulation for switching a direction in which the vehicle is to start between a forward direction and a backward direction; and
that the pattern storage unit (line-of-sight information database 45) is stored with, as the driver line-of-sight direction patterns, data indicating a line-of-sight direction variation pattern corresponding to switching to the forward direction and data indicating a line-of-sight direction variation pattern corresponding to switching to the backward direction.

(iv) The drive assisting apparatus according to any one of items (i) to (iii), characterized in:
that the manipulation detection unit (status judging unit 62) detects a manipulation for changing the running direction of the vehicle to a rightward direction or a leftward direction (steps S11-S13, S21, and S22); and
that the pattern storage unit (behavior database 61) is stored with, as the driver line-of-sight direction patterns, data indicating line-of-sight direction variation patterns corresponding to a rightward running direction change and a leftward running direction change, respectively.

(v) The drive assisting apparatus according to item (ii), characterized in that the warning signal output unit (vehicle state reflecting unit 24) automatically selects a threshold value (threshold information SG15) to be compared with the ratio of the period when the line-of-sight direction detected by the line-of-sight direction detection unit does not exist in the prescribed region, according to a vehicle state including a running speed of the vehicle.

According to the drive assisting apparatus of the invention, a warning signal can be output by automatically detecting a dangerous situation such as an inattentive drive or an erroneous start of the vehicle. Furthermore, since whether the vehicle is in a dangerous situation is judged on the basis of the combinations of a vehicle running state and a driver drive manipulation and a driver line-of-sight direction pattern, a dangerous situation can be detected correctly with various drive manipulation statuses and various drive manipulation statuses.

According to the drive assisting apparatus of the invention, an inattentive drive of the driver can be detected automatically and a warning signal can be output in response. Furthermore, the ratio of a period when the detected line-of-sight direction does not exist in the prescribed region, whether the vehicle is in a dangerous situation such as an inattentive drive can be judged with high accuracy.

According to the drive assisting apparatus of the invention, an imminent erroneous start of the vehicle due to a wrong recognition of the driver can be detected automatically and a warning signal can be output in response. A drive manipulation (e.g., a shift lever manipulation) for starting the vehicle forward and a drive manipulation for starting the vehicle backward are associated with different variation patterns of the line-of-sight direction of the driver. Furthermore, in a case that the driver is convinced that the vehicle will start forward though actually the vehicle is going to start backward or the driver is convinced that the vehicle will start backward though actually the vehicle is going to start forward, a combination of a detected drive manipulation and line-of-sight direction variation pattern does not coincide with any of the combinations of the stored data. Thus, such an abnormal state can be detected correctly before occurrence of an erroneous start.

According to the drive assisting apparatus of the invention, whether the driver has checked, visually, a surrounding situation for safety confirmation in turning right or left or changing to an adjoining lane can be detected automatically on the basis of the stored line-of-sight direction variation patterns.

According to the drive assisting apparatus of the invention, the threshold value is changed automatically according to the vehicle state, the accuracy of detection of an inattentive drive can be increased. For example, in an ordinary drive, the size etc. of a region where the line of sight direction of the driver exists vary depending on the running speed of the vehicle. Erroneous detection and non-detection an inattentive drive can be prevented by changing the threshold value so that it follows such variations in the size etc. of the line-of-sight region.

The drive assisting apparatus according to the invention makes it possible to output a warning signal by automatically detecting a dangerous situation such as an inattentive drive or an erroneous start of the vehicle. Furthermore, since whether the vehicle is in a dangerous situation is judged on the basis of the combinations of a vehicle running state and a driver drive manipulation and a driver line-of-sight direction pattern, a dangerous situation can be detected correctly with various drive manipulation statuses and various drive manipulation statuses.

The invention has been described above concisely. The details of the invention may be made more apparent when the modes for carrying out the invention (hereinafter referred to as embodiments) described below are read through with reference to the accompanying drawings.

What is claimed is:

1. A drive assisting apparatus comprising:
an electronic control unit having a microcomputer as a main component and configured to implement control elements that correspond to respective software processes executed by at least one of the microcomputer and a dedicated hardware element, the control elements including:
a running state detection unit which detects a running state of a vehicle;
a manipulation detection unit which detects a drive manipulation of a driver on the vehicle;
a line-of-sight direction detection unit which detects a line-of-sight direction of the driver;
a pattern storage unit which is stored in advance with data indicating combinations of a vehicle running state and a driver drive manipulation and a driver line-of-sight direction pattern; and
a warning signal output unit which outputs a warning signal if a combination of the running direction detected by the running state detection unit, the drive manipulation detected by the manipulation detection unit, and the line-of-sight direction detected by the line-of-sight direction detection unit is different from any of the combinations of the data stored in the pattern storage unit.

2. The drive assisting apparatus according to claim 1, wherein
the pattern storage unit is stored with, as the driver line-of-sight pattern, data indicating a prescribed region in which the line of sight of the driver should exist when the vehicle is running forward, and
the warning signal output unit outputs the warning signal if forward running of the vehicle is detected by the running state detection unit and a ratio of a period when the line-of-sight direction detected by the line-of-sight direction detection unit does not exist in the prescribed region is larger than or equal to a prescribed value.

3. The drive assisting apparatus according to claim 1, wherein
the manipulation detection unit detects a switching manipulation for switching a direction in which the vehicle is to start between a forward direction and a backward direction, and
the pattern storage unit is stored with, as the driver line-of-sight direction patterns, data indicating a line-of-sight direction variation pattern corresponding to switching to the forward direction and data indicating a line-of-sight direction variation pattern corresponding to switching to the backward direction.

4. The drive assisting apparatus according to claim 1, wherein
the manipulation detection unit detects a manipulation for changing the running direction of the vehicle to a rightward direction or a leftward direction, and
the pattern storage unit is stored with, as the driver line-of-sight direction patterns, data indicating line-of-sight direction variation patterns corresponding to a rightward running direction change and a leftward running direction change, respectively.

5. The drive assisting apparatus according to claim 2, wherein
the warning signal output unit automatically selects a threshold value to be compared with the ratio of the period when the line-of-sight direction detected by the line-of-sight direction detection unit does not exist in the prescribed region, according to a vehicle state including a running speed of the vehicle.

6. The drive assisting apparatus according to claim 1, wherein
the running state detection unit detects a running state of a vehicle from information gathered by at least one of onboard vehicular sensors and an electronic control unit.

7. The drive assisting apparatus according to claim 1, wherein
the manipulation detection unit detects a drive manipulation of a driver on the vehicle from information gathered by at least one of the onboard vehicular sensors and the electronic control unit.

8. The drive assisting apparatus according to claim 1, wherein
the line-of-sight direction detection unit detects a line-of-sight direction of the driver from information gathered by at least one vehicular camera facing the driver and image recognition software.

9. The drive assisting apparatus according to claim 1, wherein
the pattern storage unit is configured as a storage device including nonvolatile memory.

10. The drive assisting apparatus according to claim 1, wherein
the warning signal output unit includes of comparative software.

11. The drive assisting apparatus according to claim 6, wherein
the running state detection unit detects information including at least one of vehicle speed, vehicle transmission state, vehicle ignition state, and proximity of other vehicles to the vehicle.

12. The drive assisting apparatus according to claim 7, wherein
the manipulation detection unit detects information including at least one of turn indicator lever manipulation, right turn manipulation, left turn manipulation, brake pedal manipulation, transmission manipulation, and accelerator pedal manipulation.

13. The drive assisting apparatus according to claim 8, wherein
the line-of-sight direction detection unit detects the line-of-sight of the driver from information including at least one of center positions of irises of the driver, center positions of Purkinje images produced by reflection of infrared light by cornea surfaces of the driver, and center positions of eyeballs of the driver.

14. The drive assisting apparatus according to claim 9, wherein
the pattern storage unit stores information of a same format as the output from at least one of the line-of-sight direction detection unit, the manipulation detection unit, and the running state detection unit.

15. The drive assisting apparatus according to claim 10, wherein the warning signal can cause at least one of a speaker, and a video display device to alert the driver.

* * * * *